United States Patent
Higashiya et al.

(10) Patent No.: US 10,748,576 B2
(45) Date of Patent: Aug. 18, 2020

(54) HEAD GIMBAL ASSEMBLY AND MAGNETIC DISK DEVICE HAVING THE SAME

(71) Applicants: Kabushiki Kaisha Toshiba, Minato-ku, Tokyo (JP); Toshiba Electronic Devices & Storage Corporation, Minato-ku, Tokyo (JP)

(72) Inventors: Teruyoshi Higashiya, Naka Kanagawa (JP); Toru Watanabe, Kawasaki Kanagawa (JP); Masami Yamane, Kawasaki Kanagawa (JP); Kazuhiro Furutani, Yokohama Kanagawa (JP); Kan Takahashi, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/055,256

(22) Filed: Aug. 6, 2018

(65) Prior Publication Data
US 2019/0267038 A1 Aug. 29, 2019

(30) Foreign Application Priority Data
Feb. 23, 2018 (JP) ................................. 2018-031198

(51) Int. Cl.
*G11B 5/60* (2006.01)
*G11B 21/21* (2006.01)
(Continued)

(52) U.S. Cl.
CPC .............. *G11B 21/21* (2013.01); *G11B 5/40* (2013.01); *G11B 5/41* (2013.01); *G11B 5/60* (2013.01);
(Continued)

(58) Field of Classification Search
None
See application file for complete search history.

(56) References Cited

U.S. PATENT DOCUMENTS 6,587,308 B2 * 7/2003 Sannino ............... G11B 5/6005
360/235.6
6,590,746 B2 * 7/2003 Kang ................... G11B 5/6005
360/236.3
(Continued)

FOREIGN PATENT DOCUMENTS

JP 2002032905 A * 1/2002 ........... G11B 5/6005
JP 2009-110618 A 5/2009
(Continued)

*Primary Examiner* — William J Klimowicz
(74) *Attorney, Agent, or Firm* — White & Case LLP

(57) ABSTRACT

According to one embodiment, a head gimbal assembly includes a suspension and a magnetic head supported by the suspension via a gimbal portion. The magnetic head includes a slider and a head portion provided in the slider. The slider includes an air bearing surface, a pair of side surfaces, a leading-side end surface, and a trailing-side end surface. The slider includes a deep groove which is formed between the leading-side step portion and the trailing-side step portion and is open to the air bearing surface and the pair of side surfaces, and a pair of partition walls which extends from the trailing-side step portion toward the leading-side step portion along the pair of side surfaces to close at least a portion of a side surface opening of the deep groove.

13 Claims, 8 Drawing Sheets

(51) Int. Cl.
*G11B 7/122* (2012.01)
*G11B 5/40* (2006.01)
*G11B 5/41* (2006.01)
*G11B 11/105* (2006.01)

(52) U.S. Cl.
CPC .......... *G11B 5/6005* (2013.01); *G11B 5/6041* (2013.01); *G11B 5/6082* (2013.01); *G11B 7/122* (2013.01); *G11B 11/1058* (2013.01)

(56) References Cited

U.S. PATENT DOCUMENTS

| | | | | |
|---|---|---|---|---|
| 6,661,611 | B1* | 12/2003 | Sannino | G11B 5/6005 360/235.7 |
| 6,661,612 | B1* | 12/2003 | Peng | G11B 5/6005 360/235.8 |
| 6,744,599 | B1* | 6/2004 | Peng | G11B 5/6005 360/236.1 |
| 7,005,127 | B2 | 2/2006 | Song et al. | |
| 7,099,114 | B2* | 8/2006 | Kang | G11B 5/6005 360/235.6 |
| 8,081,400 | B1* | 12/2011 | Hu | G11B 5/6082 360/236.3 |
| 8,184,405 | B1* | 5/2012 | Zheng | G11B 5/6082 360/266.3 |
| 8,203,805 | B2 | 6/2012 | Huang et al. | |
| 8,493,688 | B2* | 7/2013 | Ambekar | G11B 5/6082 360/236.2 |
| 9,082,441 | B1* | 7/2015 | Hu | G11B 5/6082 |
| 9,911,444 | B1* | 3/2018 | Yamane | G11B 5/6082 |
| 2002/0001157 | A1* | 1/2002 | Kang | G11B 5/6005 360/236.3 |
| 2002/0075599 | A1* | 6/2002 | Rao | G11B 5/6005 360/235.7 |
| 2002/0145828 | A1 | 10/2002 | Mundt et al. | |
| 2004/0012887 | A1 | 1/2004 | Rajakumar et al. | |
| 2008/0068756 | A1* | 3/2008 | Tsuda | G11B 5/6005 360/235.5 |
| 2008/0158716 | A1* | 7/2008 | Kubotera | G11B 5/6005 360/75 |
| 2009/0109572 | A1 | 4/2009 | Watanabe | |
| 2010/0103560 | A1 | 4/2010 | Imamura et al. | |
| 2011/0058275 | A1 | 3/2011 | Kohira et al. | |
| 2014/0192440 | A1 | 7/2014 | Rajasekharan et al. | |

FOREIGN PATENT DOCUMENTS

| | | |
|---|---|---|
| JP | 2009-116062 A | 5/2009 |
| JP | 2014-116062 A | 6/2014 |

\* cited by examiner

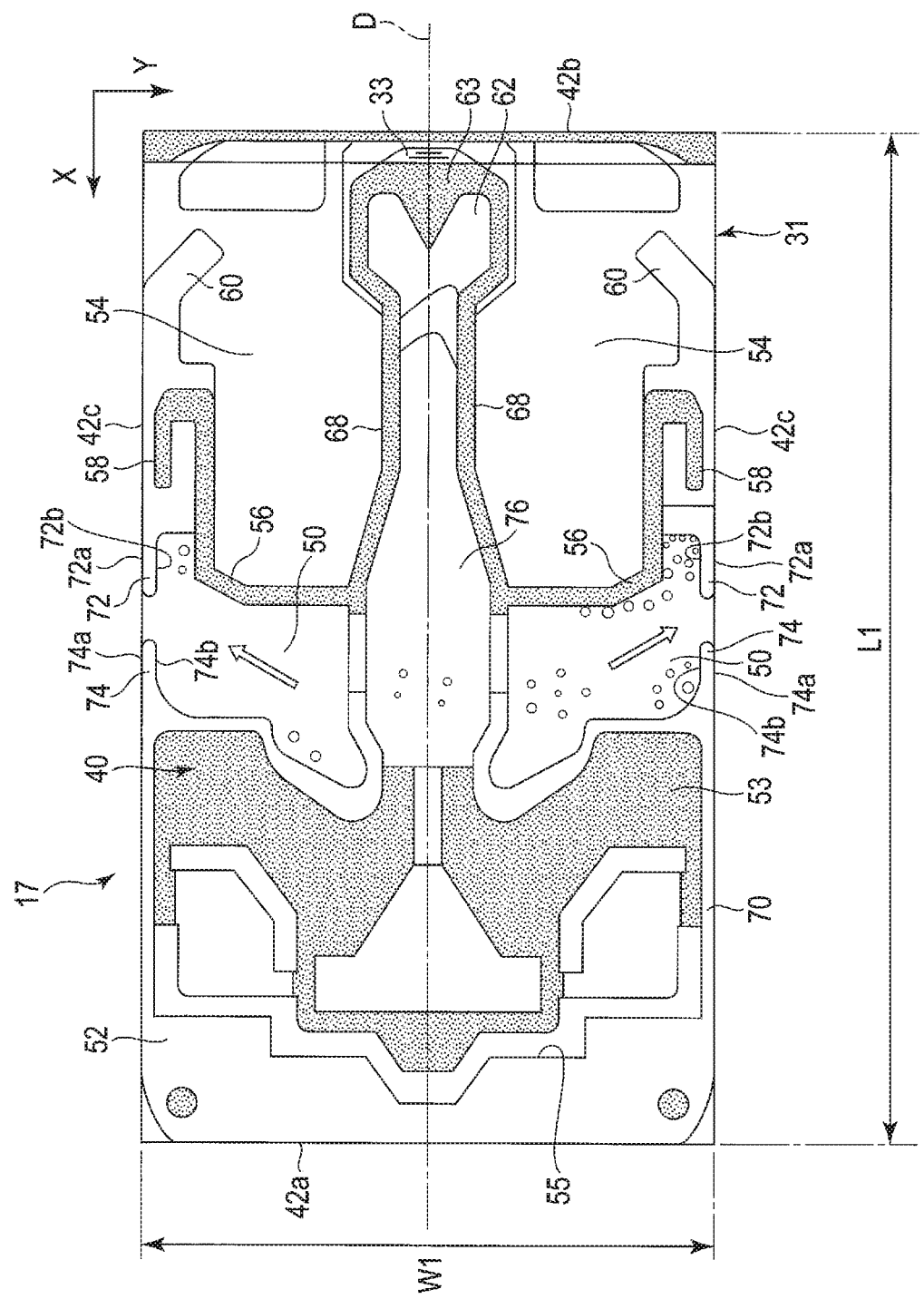
F I G. 4

HEAD GIMBAL ASSEMBLY AND MAGNETIC DISK DEVICE HAVING THE SAME

CROSS-REFERENCE TO RELATED APPLICATIONS

This application is based upon and claims the benefit of priority from Japanese Patent Application No. 2018-031198, filed Feb. 23, 2018, the entire contents of which are incorporated herein by reference.

FIELD

Embodiments described herein relate generally to a head gimbal assembly and a magnetic disk device having the same.

BACKGROUND

A magnetic disk device, for example, a hard disk drive (HDD) comprises a magnetic disk which is rotatably provided and a head gimbal assembly. The head gimbal assembly comprises a suspension having a gimbal portion and a magnetic head supported by the gimbal portion.

The magnetic head includes a slider and a head portion provided on the slider. The head portion includes a read element for read and a recording element for write. The slider includes a facing surface (Air Bearing Surface: ABS) which faces a recording layer of the magnetic disk. The ABS includes one or more positive pressure generating surfaces on an upstream side (inflow side) and a downstream side (outflow side) and at least a pair of negative pressure generating grooves on the downstream side. In addition, the ABS has a groove portion lower than the pressure generating surface between a pressure generating surface on an inflow side and a pressure generating surface on an outflow side, and the groove portion is formed on the same surface up to the side portion of the slider.

During an operation of a disk drive, an air flow is generated between the rotating magnetic disk and the slider, and the ABS of the slider is subjected to a force (positive pressure) which flies the slider from a magnetic disk recording surface according to a principle of air fluid lubrication. By balancing the flying force and a head load, the slider flies with a gap from the magnetic disk recording surface.

Although the disk drive is kept at a high degree of cleanliness, there is contamination such as a small amount of dust or dirt in the drive. Liquid contamination such as a lubricant is mainly stored in a groove of the ABS and flows to the side portion of the slider. The liquid contamination reaching the side portion flows to the downstream side of the magnetic head and finally falls onto the magnetic disk. As a result, a gap between the magnetic head and the magnetic disk is changed, which may adversely affect the magnetic head or the magnetic disk.

BRIEF DESCRIPTION OF THE DRAWINGS

FIG. 4 is a plan view showing the ABS side of the magnetic head.

DETAILED DESCRIPTION

Figure 1:
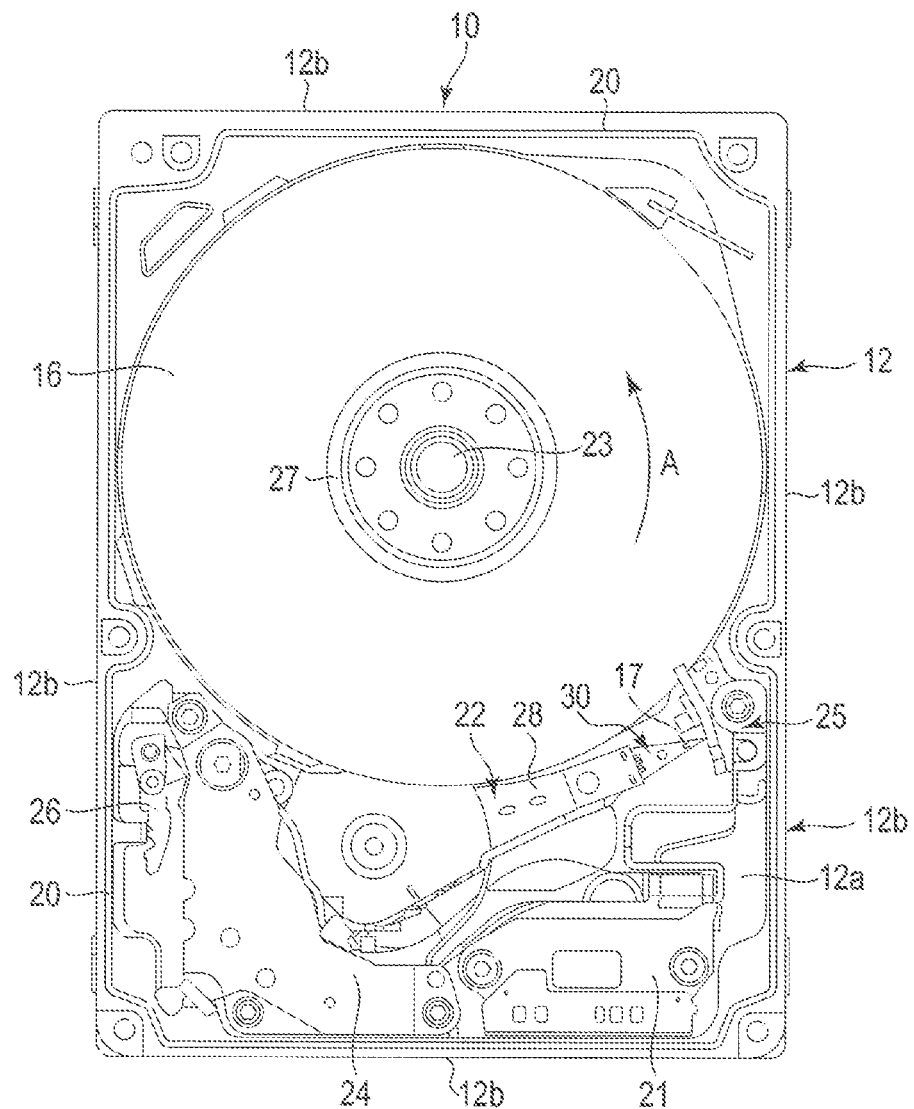
FIG. 1 is a plan view showing the internal structure of a hard disk drive (HDD) according to an embodiment.

Various embodiments will be described hereinafter with reference to the accompanying drawings. In general, according to one embodiment, a head gimbal assembly comprises a suspension; a gimbal portion provided in the suspension; and a magnetic head supported by the gimbal portion. The magnetic head comprises a slider which comprises an air bearing surface including a pair of side edges, a pair of side surfaces along die pair of side edges, a leading-side end surface, and a trailing-side end surface, and a head portion provided in the slider and configured to record and read data. The slider comprises a leading-side step portion provided on a leading-side end portion of the air bearing surface, a trailing-side step portion which is provided on a trailing-side end portion of the air bearing surface and in which the head portion is imbedded, a deep groove which is formed between the leading-side step portion and the trailing-side step portion and is open to the air bearing surface and the pair of side surfaces, and a pair of partition walls which extends from the trailing-side step portion toward the leading-side step portion along the pair of side surfaces to close at least a part of a side surface opening of the deep groove.

The disclosure is merely an example, and appropriate changes performed by those skilled in the art within the gist of the present invention and matters easily conceived by those skilled in the art are included in the scope of the present invention. In addition, in order to make the explanation clearer, the drawings may be schematically represented in terms of a width, a thickness, a shape, or the like of each part as compared with actual aspects. However, it is only an example, and does not limit the interpretation of the present invention. Moreover, in the present specification and each drawing, the same reference numerals are assigned to the same elements as those described above with reference to the preceding drawings, and detailed explanation thereof may be appropriately omitted.

Embodiment

A hard disk drive (HDD) according to an embodiment will be described in detail as an example of a magnetic disk device. FIG. 1 is a plan view showing the internal structure of an HDD according to a first embodiment.

As shown in FIG. 1, the HDD has a housing 10. The housing 10 includes a rectangular box-shaped base 12 having an upper end opening and a top cover (not shown) which closes an upper end opening of the base 12. The base 12 includes a rectangular bottom wall 12a and side walls 12b which are erected along a peripheral edge of the bottom wall 12a.

In the housing 10, there are provided one or a plurality of magnetic disks 16 as a recording medium, and a spindle motor 23 as a driving unit for supporting and rotating the magnetic disk 16. The magnetic disk 16 is coaxially fitted to a hub (not shown) of the spindle motor 23 and clamped by a clamp spring 27 to be fixed to the hub. The magnetic disk 16 is rotated at a predetermined speed in a direction of an arrow A by the spindle motor 23.

A plurality of magnetic heads 17 for writing/reading data to/from the magnetic disk 16, and a carriage assembly 22 movably supporting the magnetic head 17 with respect to the magnetic disk 16 are provided in the housing 10. In the housing 10, there are provided a voice coil motor (hereinafter, referred to as VCM) 24 which rotates and positions the carriage assembly 22, a lamp load mechanism 25 which holds the magnetic head 17 at an unload position separated from the magnetic disk 16 when the magnetic head 17 moves to an outermost periphery of the magnetic disk 16, a latch mechanism 26 which holds the carriage assembly 22 at a retreated position when an impact or the like acts on the HDD, and a substrate unit 21 having a conversion connector or the like.

A printed circuit board (not shown) is screwed to an outer surface of the bottom wall 12a of the base 12. The printed circuit board controls operations of the VCM 24 and the magnetic head 17 via the substrate unit 21 and controls an operation of the spindle motor 18.

Figure 2:
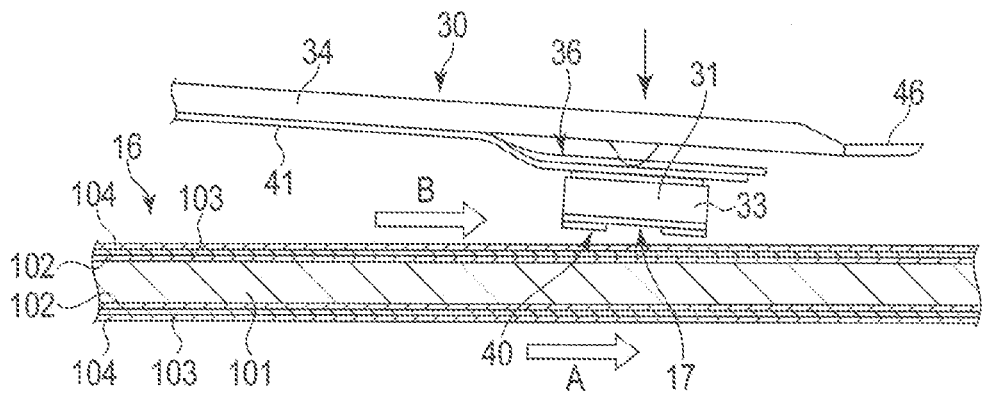
FIG. 2 is an enlarged side view showing a magnetic disk, a magnetic head, and a suspension of the HDD.

FIG. 2 schematically shows the magnetic head and the magnetic disk in a flying state. As shown in FIGS. 1 and 2, for example, the magnetic disk 16 has a substrate 101 made of a nonmagnetic material formed in a disk shape having a diameter of approximately 2.5 inches (6.35 cm). On each of both surfaces of the substrate 101, a soft magnetic layer 102 formed of a material exhibiting soft magnetic characteristics as an under layer, a magnetic recording layer 103 provided as an upper layer portion thereof, and a protective film layer 104 provided as an upper layer thereof are laminated in this order.

The carriage assembly 22 includes a plurality of arms 28 and head gimbal assemblies 30 extending from respective arms 28. Each head gimbal assembly 30 includes an elongated leaf spring-shaped suspension 34, a flexure 41 as a wiring member provided on the suspension 34, and the magnetic head 17. The magnetic head 17 is supported by a tip end portion of the suspension 34 via the gimbal portion 36 of the flexure 41.

As shown in FIG. 2, the magnetic head 17 is configured as a flying type head, and includes a slider 31 formed in a substantially rectangular parallelepiped shape and a head portion 33 formed on an end portion on an outflow end (trailing) side of the slider 31. The slider 31 includes an air bearing surface (ABS) 40 facing the surface of the magnetic disk 16. The magnetic head 17 flies due to an air flow B generated between a surface of the magnetic disk 16 and the ABS 40 of the slider 31 by a rotation of the magnetic disk 16. The direction of the air flow B coincides with a rotation direction A of the magnetic disk 16.

Figure 3:
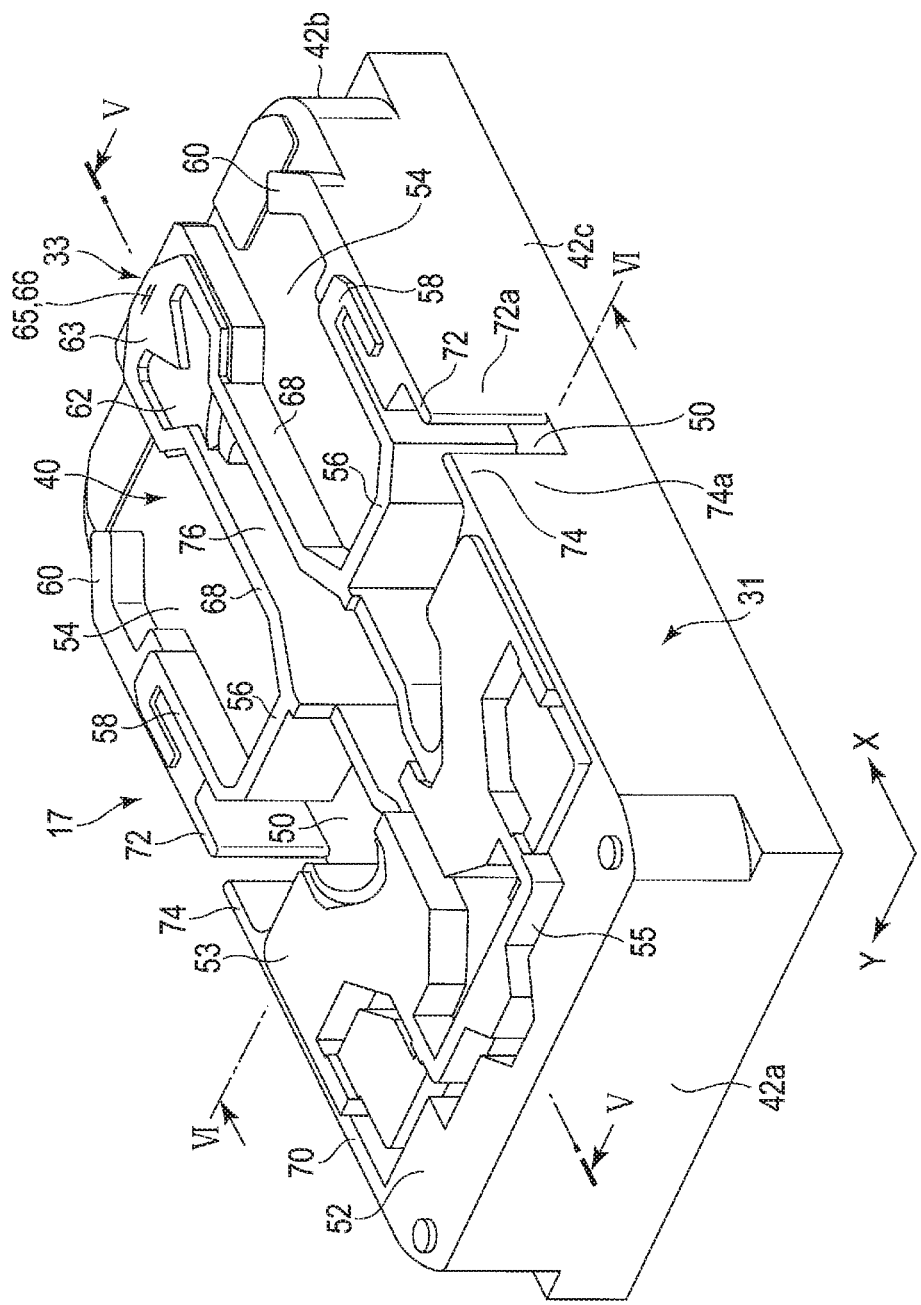
FIG. 3 is a perspective view showing an air bearing surface (ABS) side of the magnetic head.

Next, a configuration of the magnetic head 17 will be described in detail. FIG. 3 is a perspective view showing the slider of the magnetic head, and FIG. 4 is a plan view showing the ABS side of the slider.

As shown in FIGS. 3 and 4, the slider 31 of the magnetic head 17 is formed in a substantially rectangular parallelepiped shape, and includes the rectangular air bearing surface (disk facing surface) (ABS) 40 facing the surface of the magnetic disk 16, an inflow-side end surface (a leading-side end surface) 42a extending orthogonally to the ABS 40, an outflow-side end surface (a trailing-side end surface) 42b extending orthogonally to the ABS 40, and a pair of side surfaces (side portions) 42c which is orthogonal to the ABS 40 and extends between the inflow-side end surface 42a and the outflow-side end surface 42b.

A longitudinal direction of the ABS 40 is defined as a first direction X, and a width direction perpendicular to the first direction X is defined as a second direction Y. In an example, the slider 31 has a length L1 in the first direction X of 1.25 mm or less, for example, 1.235 mm, a width W1 in the second direction Y of 1.0 mm or less, for example 0.7 mm, and a thickness T1 of 0.23 to 0.3 mm, and is configured as a so-called pemto-slider.

Figure 5:
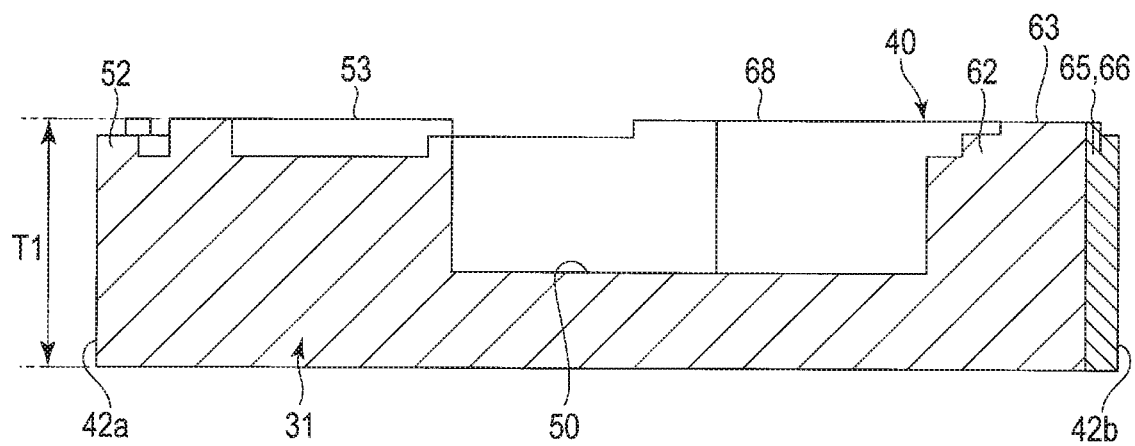
FIG. 5 is a sectional view of the magnetic head taken along line V-V of FIG. 3.
Figure 6:
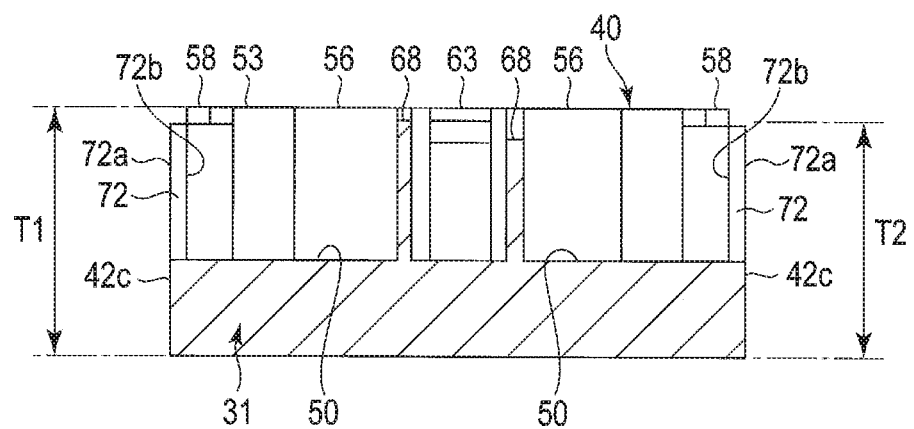
FIG. 6 is a sectional view of the magnetic head taken along line VI-VI of FIG. 3.

FIG. 5 is a longitudinal sectional view of the slider along line V-V of FIG. 3 and FIG. 6 is a cross sectional view of the slider taken along line VI-VI of FIG. 3.

As shown in FIGS. 3 to 5, a strip-shaped deep grooves 50 extending over the entire length in the second direction Y is formed substantially in a center portion in the first direction X of the ABS 40. The deep groove 50 has a flat bottom surface and is open to the side surfaces 42c of the slider 31. For example, when the thickness T1 of the slider 31 is 0.23 mm, a depth of the deep groove 50 is set to 1 to 5 μm, for example, 3 μm. The deep groove 50 is provided, and thus, it is possible to generate a negative pressure at the leading side of the deep groove 50 at all yaw angles realized by the HDD.

A substantially rectangular leading step 52 is formed on the leading-side end portion of the ABS 40. The leading step 52 protrudes from the bottom surface of the deep groove 50 and is positioned on an inflow side of the deep groove 50 with respect to the air flow B.

In order to maintain a pitch angle of the magnetic head 17, a leading pad (inflow-side pressure generating surface) 53 supporting the slider 31 by an air film protrudes from the leading step 52. The leading pad 53 is formed in an N shape opening at a plurality of positions toward the inflow side. An upper surface of the leading pad 53 configures the uppermost surface of the slider 31 and configures a portion of the ABS 40. A leading groove 55 is formed at a position slightly shifted to an outflow side from an inflow end of the leading step 52.

As shown in FIGS. 3 to 5, a negative pressure cavity 54 configured of a recess is formed from the substantially central portion of the ABS 40 to the outflow-side end surface 42b. The negative pressure cavity 54 is positioned on the outflow end side of the deep groove 50 and is open toward the outflow-side end surface 42b. The negative pressure cavity 54 is formed to be shallower than the deep groove 50, that is, the negative pressure cavity 54 is formed at a position higher than the bottom surface of the deep groove 50. A depth of the negative pressure cavity 54 is formed to be 500 to 1500 nm, for example, 1000 nm. The negative pressure cavity 54 is provided, and thus, it is possible to generate a negative pressure at all yaw angles realized by the HDD.

In the ABS 40, a rib-shaped intermediate cross rail 56, a pair of side pads 58, and a pair of skirts 60 are formed so as to surround the negative pressure cavity 54. The intermediate cross rail 56 is positioned between the deep groove 50 and the negative pressure cavity 54 and extends between both side edges of the ABS 40 in the second direction Y. The intermediate cross rail 56 protrudes from, a bottom surface of the negative pressure cavity 54 and is positioned on the inflow side of the negative pressure cavity 54 with respect to the air flow B.

The pair of side pads 58 is formed along each side edge of the ABS 40 and extends from the intermediate cross rail 56 to the outflow end side of the ABS 40. The side pads 58 protrude from the bottom surface of the negative pressure cavity 54.

The pair of skirts 60 is formed along each side edge (side surface 42c) of the ABS 40 and each skirt 60 extends from the side pad 58 in the first direction X to the vicinity of the outflow-side end surface 42b of the ABS 40. Each skirt 60 protrudes from the bottom surface of the negative pressure cavity 54 and is formed to be lower than the side pad 58.

The intermediate cross rail 56, the pair of side pads 58, and the pair of skirts 60 are formed in a substantially U shape which is closed on an upstream side and is open toward a downstream side as a whole. The negative pressure cavity 54 is defined by the intermediate cross rail 56, the pair of side pads 58, and the pair of skirts 60.

As shown in FIGS. 3 to 6, the slider 31 includes a trailing step 62 formed at an outflow-side end portion of the ABS 40 in the direction of the air flow B. The trailing step 62 protrudes from the bottom surface of the negative pressure cavity 54, and is formed such that a protruding height thereof is the same as that of the leading step 52. The trailing step 62 is positioned at the substantially center in the second direction Y of the ABS 40. A trailing pad (outflow-side pressure generating surface) 63 for supporting the slider 31 by an air film protrudes from an upper surface of the trailing step 62.

The trailing pad 63 is provided with a gap on the inflow side from the outflow-side end surface of the trailing step 62, here, the outflow-side end surface 42b of the slider 31. The trailing pad 63 is formed at the same height level as the leading pad 53, the intermediate cross rail 56, and the side pad 58 and becomes the uppermost surface of the slider 31 so as to configure a portion of the ABS 40.

The head portion 33 of the magnetic head 17 includes a recording element 65 and a reading element 66 for recording/reading information to/from the magnetic disk 16. The recording element 65 and the reading element 66 are embedded into a downstream-side end portion of the slider 31 in the direction of the air flow B, here, into the trailing step 62. Tip end portions of the recording element 65 and the reading element 66 are exposed to the ABS 40 at the position of the trailing pad 63.

The ABS 40 of the slider 31 includes a pair of elongated center rails 68 extending from the intermediate cross rail 56 to the trailing step 62 in the first direction X. The pair of center rails 68 is positioned on both sides of a central axis D of the slider 31 and faces each other with a gap in the second direction Y. The center rails 68 are formed such that a height of each center rail 68 from the bottom surface of the negative pressure cavity 54 is the same as the height of each of the intermediate cross rail 56 and the trailing pad 63. A guide groove 76 for guiding the air flow to the trailing step 62 and the trailing pad 63 is formed between the pair of center rails 62. The guide groove 76 is formed along the center axis D and passes through the deep groove 50 to further extend to the leading step 52.

The above-described leading step 52 configures an inflow-side step portion of the slider 31, and the intermediate cross rail 56, the side pads 58, and the trailing step 62 configure an outflow-side step portion of the slider 31. The deep groove 50 is provided between the inflow-side step portion and the outflow-side step portion.

As shown in FIGS. 3, 4, and 6, in the present embodiment, the slider 31 comprises a pair of first partition walls (ribs) 72 and a pair of second partition walls 74 which are provided in side surface portions of the slider to partially close side surface openings of the deep grooves 50. Each of the first partition walls 72 is erected on the bottom surface of the deep groove 50 and extends from the trailing-side step portion along the side surface 42c, here, the side pad 58 toward the leading-side step portion 52 to close a part of the side surface opening of the deep groove 50. The first partition wall 72 includes an outer side surface 72a which is flush with the side surface 42c and an inner side surface 72b which is opposite to the outer side surface 72a and faces the deep groove 50. In the present embodiment, the inner side surface 72b extends to be substantially parallel to the outer side surface 72a. Each of the first partition walls 72 has a height T2 lower than a height T1 of an uppermost surface (positive generating surface) of the ABS 40.

Each of the second partition walls 74 is erected on the bottom surface of the deep groove 50 and extends from the leading-side step portion 52 along the side surface 42c toward the trailing-side step portion to close a portion of the side surface opening of the deep groove 50. An extended end of the second partition wall 74 faces an extended end of the first partition wall 72 with a gap therebetween. The second partition wall 74 includes an outer side surface 74a which is flush with the side surface 42c and an inner side surface 74b which is opposite to the outer side surface 74a and faces the deep groove 50. In the present embodiment, the inner side surface 74b extends to be substantially parallel to the outer side surface 74a. Each of the second partition walls 74 has the height T2 lower than the height T1 of the uppermost surface (positive generating surface) of the ABS 40.

According to the magnetic head 17 of the head gimbal assembly 30 configured as described above, the slider 31 includes the first partition walls 72 and the second partition walls 74 provided to close at least a apart of the side surface openings of the deep grooves 50. Accordingly, as schematically shown in FIG. 4, a movement of a lubricant or liquid contamination (shown by minute circles) adhering to a center portion of the magnetic head 17 (slider 31) or into the deep groove 50 is hindered by the first partition wall 72 and the second partition wall 74 in a process of flowing through the deep groove 50 to the downstream side (as shown by an arrow), that is, the side surface 42c side, and the lubricant or the liquid contamination remains on the inner side surfaces 72a and 74a sides of the first partition wall 72 and the second partition wall 74. Accordingly, it is possible to prevent the lubricant or the liquid contamination from flowing out to the side surface 42c of the slider 31 and from falling onto the magnetic disk 16. Accordingly, it possible to suppress failure and characteristic deterioration of the magnetic head 17 and the magnetic disk 16 caused by contamination and to improve the reliability of the magnetic disk device.

From the above, according to the first embodiment, there can be obtained the head gimbal assembly and the magnetic disk device, in which the failure caused by contamination decreases and reliability is improved.

Dimensions such as the shape, width, length, or depth of each of the first partition wall and the second partition wall are not limited to the present embodiment, and various modifications are possible. In addition, the partition wall is not limited to two partition walls such as the first and second partition walls, and any one partition wall may be provided.

Next, various modifications will be described. In the modifications to be described, the same parts as those of the first embodiment will be denoted by the same reference numerals as in the first embodiment and detailed description thereof will be omitted or simplified, and the parts different from these of the first embodiment will be described in detail.

(First Modification)

Figure 7:
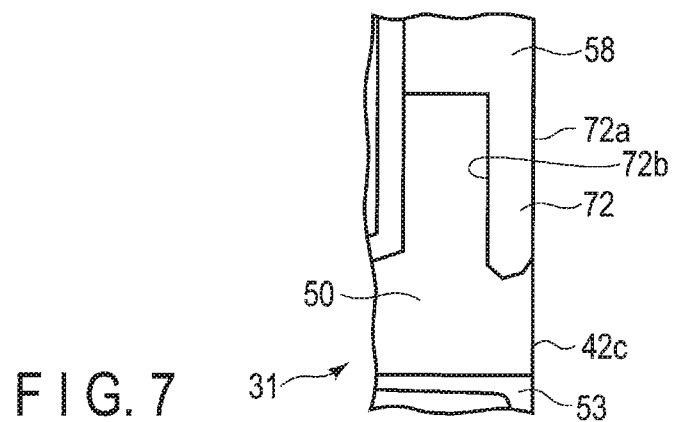
FIG. 7 is a view schematically showing a partition wall of a slider of a magnetic head according to a first modification.

FIG. 7 schematically shows a partition wall portion of a slider of a magnetic head according to a first modification. According to the first modification, a slider 31 includes only a first partition wall (partition wall) 72 which extends from a trailing-side step portion toward a leading-side step portion. That is, a second partition wall may be omitted.

In the first modification, contamination adhered to a deep groove 50 is blocked by the first partition wall 72, and it is possible to prevent the contamination from flowing out to the side surface portion.

(Second Modification)

Figure 8:
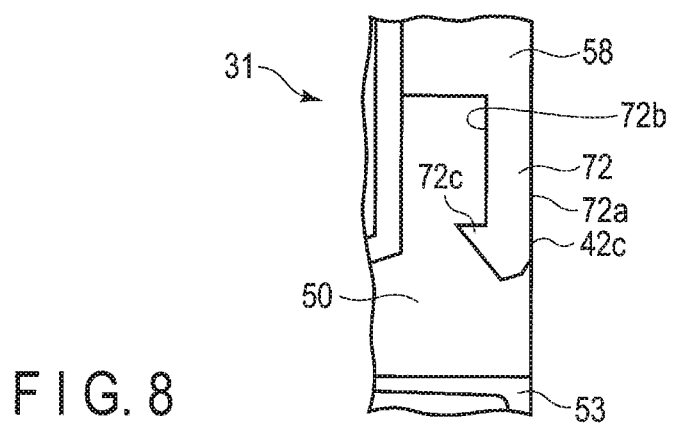
FIG. 8 is a view schematically showing a partition wall of a slider of a magnetic head according to a second modification.

FIG. 8 schematically shows a partition wall portion of a slider of a magnetic head according to a second modification. According to the second modification, a partition wall 72 includes an outer side surface 72a which extends to be flush with a side surface 42c of the slider 31 and an inner side surface 72b which is opposite to the outer side surface 72a and faces a deep groove 50. In an extended end of the partition wall 72, the inner side surface 72b includes a key-shaped protrusion 72c which protrudes toward the deep groove 50 side. In a case where the protrusion 72c is provided, a movement of contamination blocked by the partition wall 72 is hindered by the protrusion 72c, and thus, outflow of the contamination to a side surface portion is more difficult.

(Third Modification)

Figure 9:
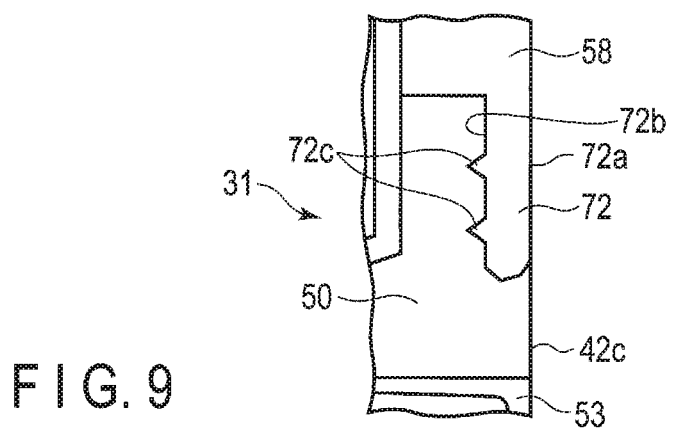
FIG. 9 is a view schematically showing a partition wall of a slider of a magnetic head according to a third modification.

FIG. 9 schematically shows a partition wall portion of a slider of a magnetic head according to a third modification. In the third modification, a plurality of protrusions 72c are provided on an inner side surface 72b of a partition wall 72.

(Fourth Modification)

Figure 10:
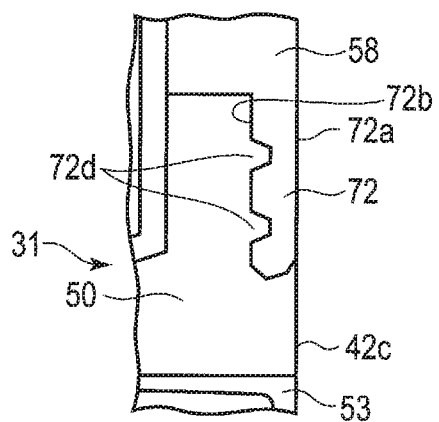
FIG. 10 is a view schematically showing a partition wall of a slider of a magnetic head according to a fourth modification.

FIG. 10 schematically shows a partition wall portion of a slider of a magnetic head according to a fourth modification. According to the fourth modification, one recess 72d or a plurality of recesses 72d are formed on an inner surface 72b of a partition wall 72. Contamination blocked by the partition wall 72 is stored in the recess 72d such that a movement of the contamination can be hindered.

(Fifth Modification)

Figure 11:
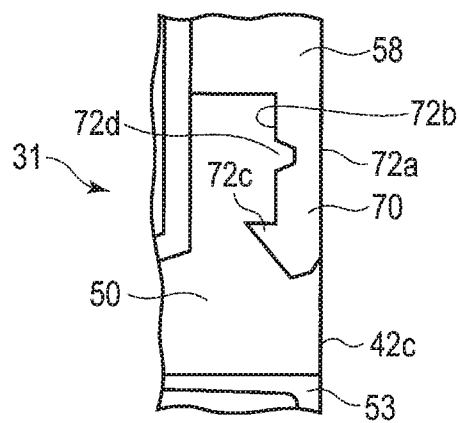
FIG. 11 is a view schematically showing a partition wall of a slider of a magnetic head according no a fifth modification.

FIG. 11 schematically shows a partition wall portion of a slider of a magnetic head according to a fifth modification. According to the fifth modification, a protrusion 72c and a recess 72d are provided on an inner side surface 72b of a partition wall 72. The protrusion 72c is provided on an extended end side of the partition wall 72 from the recess 72d.

(Sixth Modification)

Figure 12:
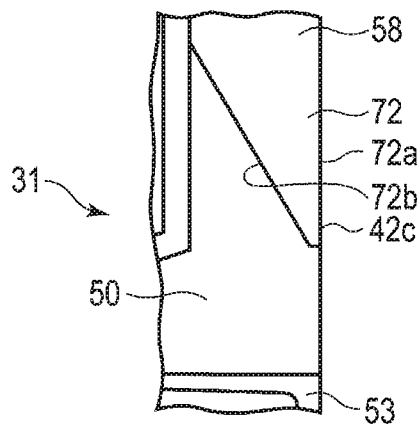
FIG. 12 is a view schematically showing a partition wall of a slider of a magnetic head according to a sixth modification.

FIG. 12 schematically shows a partition wall portion of a slider of a magnetic head according to a sixth modification. With the sixth modification, an inner side surface 72b of a partition wall 72 is not parallel to an outer side surface 72a and is inclined to the outer side surface 72a such that a width of the partition wall 72 gradually increases from an extended end toward a base end thereof. Contamination can be blocked by the partition wall 72. Conversely, the inner side surface 72b of the partition wall 72 may not be parallel to the outer side surface 72a and may be inclined to the outer side surface 72a such that the width of the partition wall 72 gradually decreases from an extended end of the partition wall 72 toward a base end thereof, and even in the case, it is possible to block the contamination.

(Seventh Modification)

Figure 13:
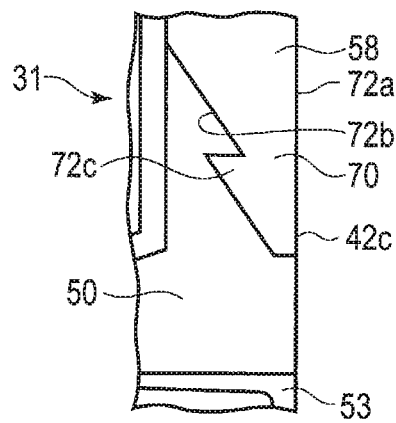
FIG. 13 is a view schematically showing a partition wall of a slider of a magnetic head according to a seventh modification.

FIG. 13 schematically shows a partition wall portion of a slider of a magnetic head according to a seventh modification.

In the seventh modification, an inner side surface 72b of a partition wall 72 is inclined to an outer side surface 72a and includes a key-shaped protrusion 72c protruding toward a deep groove 50 side.

(Eighth Modification)

Figure 14:
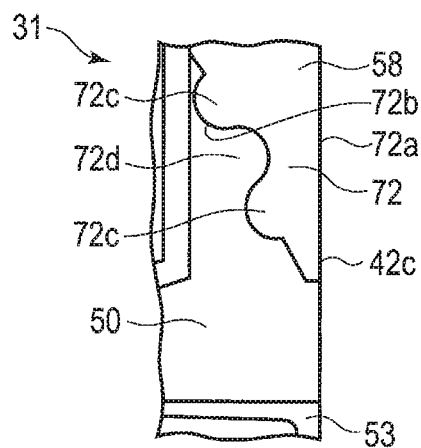
FIG. 14 is a view schematically showing a partition wall of a slider of a magnetic head according to an eighth modification.

FIG. 14 schematically shows a partition wall portion of a slider of a magnetic head according to an eighth modification.

In the eighth modification, an inner side surface 722 of a partition wall 72 is inclined to an outer side surface 72a and includes a protrusion 72c protruding toward a deep groove 50 side and a recess 72d recessed to the deep groove 50.

(Ninth Modification)

Figure 15:
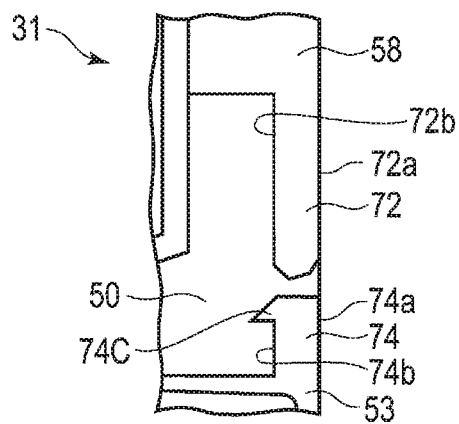
FIG. 15 is a view schematically showing a partition wall of a slider of a magnetic head according to a ninth modification.

FIG. 15 schematically shows a partition wall portion of a slider of a magnetic head according to a ninth modification. According to the ninth modification, similarly to the above-described first embodiment, a slider 31 includes a first partition wall 72 which extends from a trailing-side step portion toward a leading-side step portion and a second partition wall 74 which extends from the leading-side step portion toward the trailing-side step portion. An inner side surface 74b of the second partition wall 74 includes a key-shaped protrusion 74c protruding toward a deep groove 50 side on an extended-side portion of the inner side surface 74b.

(Tenth Modification)

Figure 16:
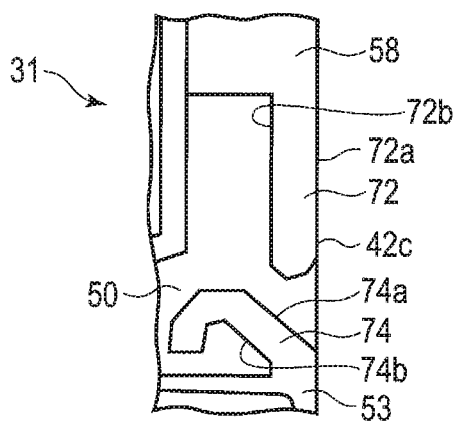
FIG. 16 is a view schematically showing a partition wall of a slider of a magnetic head according to a tenth modification.

FIG. 16 schematically shows a partition wall portion of a slider of a magnetic head according to a tenth modification. According to the tenth modification, a second partition wall 74 extends a leading-side step portion toward a trailing step portion and extends to be curved or bent in a direction away from a side, surface 42c, that is, toward an inner side of a deep groove 50.

(Eleventh Modification)

Figure 17:
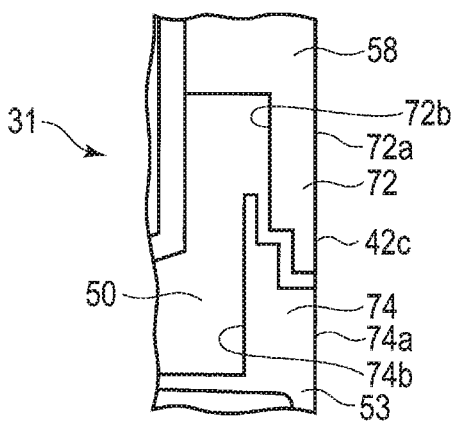
FIG. 17 is a view schematically showing a partition wall of a slider of a magnetic head according to an eleventh modification.

FIG. 17 schematically shows a partition wall portion of a slider of a magnetic head according to an eleventh modification. According to the eleventh modification, a first partition wall 72 includes an extended end which is bent in a stepwise shape, and similarly, a second partition wall 74 includes an extended end which is bent in a stepwise shape. The extended end of the first partition wall 72 and the extended end of the second partition wall 74 face each other with a stepped gap (labyrinth).

(Twelfth Modification)

Figure 18:
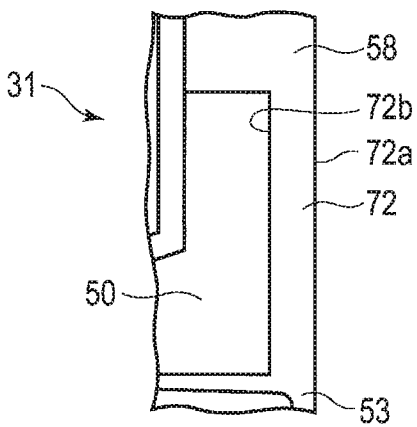
FIG. 18 is a view schematically showing a partition wall of a slider of a magnetic head according to a twelfth modification.

FIG. 18 schematically shows a partition wall portion of a slider of a magnetic head according to a twelfth modification. According to the twelfth modification, a first partition wall 72 and a second partition wall 74 are connected to each other to form one partition wall 72. That is, the partition wall 72 continuously extends from a leading-side step portion to a trailing step portion and closes substantially the entire opening of a side surface 42c side of a deep groove 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the slider of the magnetic head is not limited to the pemto-slider. The slider can be applied to a pico-slider, a femto-slider, or a slider having a larger size. In the slider, the shapes, dimensions, or the like of the trailing step, trailing pad, and other portions may be changed as necessary. In a disk drive, the size of the magnetic disk is not limited to 2.5 inches, but the magnetic disk may have other sizes. The number of magnetic disks is not limited to two and may be one or three or more, and the number of head gimbal assemblies may increase or decrease according to the number of the installed magnetic disks. The material and dimensions used for the head gimbal assembly are not limited to the embodiments, and various modifications can be made as necessary.

What is claimed is:

1. A head gimbal assembly comprising:
a suspension;
a gimbal portion provided in the suspension; and
a magnetic head supported by the gimbal portion,
wherein the magnetic head comprises
a slider which comprises an air bearing surface including a pair of side edges, a pair of side surfaces along the pair of side edges, a leading-side end surface, and a trailing-side end surface, and
a head portion provided in the slider and configured to record and read data, and
wherein the slider comprises a leading-side step portion provided on a leading-side end portion of the air bearing surface, a trailing-side step portion which is provided on a trailing-side end portion of the air bearing surface and in which the head portion is imbedded, a deep groove which is formed between the leading-side step portion and the trailing-side step portion and is open to the air bearing surface and the pair of side surfaces, and a pair of partition walls which extends from the trailing-side step portion toward the leading-side step portion along the pair of side surfaces to close a part of a side surface opening of the deep groove,
the side surface opening of the deep groove has a constant width in a thickness direction of the slider, and
each of the partition walls is shaped in a rib and includes an outer side surface which is flush with the side surface and an inner side surface which is opposite to the outer side surface and faces the deep groove so as to define a recess which is closed on a downstream side and is open toward the deep groove.

2. The head gimbal assembly of claim 1, wherein each of the partition walls has a height lower than that of a positive pressure generating surface of the air bearing surface.

3. The head gimbal assembly of claim 1, wherein
the inner side surface of each of the partition walls includes a protrusion protruding toward the deep groove.

4. The head gimbal assembly of claim 3, wherein the inner side surface extends to be inclined to the deep groove side from an extended end of the partition wall toward the trailing-side step portion with respect to the outer side surface.

5. The head gimbal assembly of claim 1, wherein the inner side surface of each of the partition walls includes a recess.

6. The head gimbal assembly of claim 5, wherein the inner side surface extends to be inclined to the deep groove side from an extended end of the partition wall toward the trailing-side step portion with respect to the outer side surface.

7. The head gimbal assembly of claim 1, wherein the slider further comprises a pair of second partition walls which extends from the leading-side step portion toward the trailing-side step portion along the pair of side surfaces and closes a part of the side surface opening of the deep groove.

8. The head gimbal assembly of claim 7, wherein each of the second partition walls is flush with the side surface.

9. The head gimbal assembly of claim 7, wherein each of the second partition walls has a height lower than that of a positive pressure generating surface of the air bearing surface.

10. A magnetic disk device comprising:
a disk-shaped recording medium which is rotatably provided; and
a head gimbal assembly which comprises a suspension, a gimbal portion provided in the suspension, and a magnetic head supported by the gimbal portion,
wherein the magnetic head comprises a slider which includes an air bearing surface including a pair of side edges, a pair of side surfaces along the pair of side edges of the air bearing surface, a leading-side end surface, and a trailing-side end surface, and a head portion which is provided in the slider and records and reads data, and
wherein the slider comprises a leading-side step portion provided on a leading-side end portion of the air bearing surface, a trailing-side step portion which is provided on a trailing-side end portion of the air bearing surface and in which the head portion is imbedded, a deep groove which is formed between the leading-side step portion and the trailing-side step portion and is open to the air bearing surface and the pair of side surfaces, and a pair of partition walls which extends from the trailing-side step portion toward the leading-side step portion along the pair of side surfaces to close a part of a side surface opening of the deep groove,
the side surface opening of the deep groove has a constant width in a thickness direction of the slider, and
each of the partition walls is shaped in a rib and includes an outer side surface which is flush with the side surface and an inner side surface which is opposite to the outer side surface and faces the deep groove so as to define a recess which is closed on a downstream side and is open toward the deep groove.

11. The magnetic disk device of claim 10, wherein
each of the partition walls has a height lower than that of
a positive pressure generating surface of the air bearing
surface.

12. The magnetic disk device of claim 10, wherein the inner side surface of each of the partition walls includes a protrusion protruding toward the deep groove.

13. The magnetic disk device of claim 10, wherein the inner side surface of each of the partition walls includes a recess.

\* \* \* \* \*